United States Patent [19]
Hill

[11] 3,792,456
[45] Feb. 12, 1974

[54] LIQUID LEVEL DETECTION SYSTEMS

[75] Inventor: William Frank Hill, Stafford, England

[73] Assignee: Joseph Lucas (Electrical) Limited, Birmingham, England

[22] Filed: July 28, 1972

[21] Appl. No.: 276,038

[30] Foreign Application Priority Data
Sept. 18, 1971 Great Britain.................... 43621/71

[52] U.S. Cl.................. 340/244 R, 73/295, 331/66, 340/59
[51] Int. Cl. ........................................... G08b 21/00
[58] Field of Search .......... 340/244, 59; 331/65, 66; 73/295; 323/68

[56] References Cited
UNITED STATES PATENTS
3,675,484    7/1972    Pederson ......................... 331/66 X Primary Examiner—Donald J. Yusko
Assistant Examiner—Daniel Myer
Attorney, Agent, or Firm—Holman & Stern

[57] ABSTRACT

A liquid level detection system for a vehicle has a positive temperature coefficient resistor mounted so that it is thermally coupled to the liquid when the liquid level is above the predetermined level. The liquid is in a container which is grounded, so that one terminal of the resistor is grounded through the liquid. The other terminal of the resistor is connected to a circuit giving a warning of resistance if the resistor changes as a result of excessive temperature rise of the liquid, or if the impedance to earth is substantially increased as a result of low liquid level.

2 Claims, 2 Drawing Figures

PATENTED FEB 12 1974    3,792,456

LIQUID LEVEL DETECTION SYSTEMS

This invention relates to a liquid level detection systems, more particularly for use in road vehicles.

The object of the invention is to provide a system which not only detects the level of the liquid and gives a warning if the level falls below a predetermined value, but also gives a warning if the temperature of the liquid rises above a predetermined value.

Figure 1:
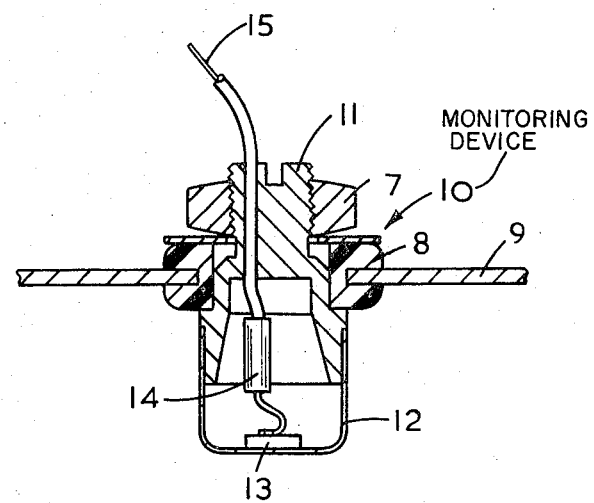
Figure 2:
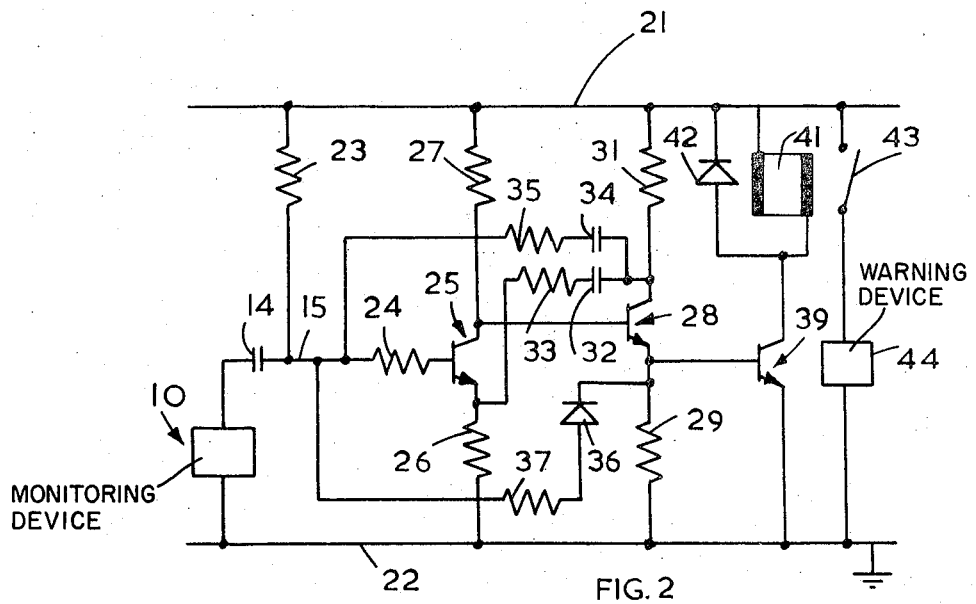

A system in accordance with the invention comprises in combination a monitoring device including a positive temperature coefficient resistor mounted so that it is thermally coupled to the liquid when the liquid level is above the predetermined level, the liquid being in a container which is earthed, and the arrangement being such that one terminal of the positive temperature coefficient resistor is connected to earth through the liquid, so that if the liquid level falls below the predetermined value, the impedance to earth will be substantially increased, the other terminal of the positive temperature coefficient of resistor being connected to a circuit which gives a warning if said impedance increases substantially, and also gives a warning if the resistance of the positive temperature coefficient resistor changes as a result of excessive rise of temperature of the liquid In the accompanying drawings, FIG. 1 is a sectional view of a monitoring device which is utilised in a system in accordance with one example of the invention, and FIG. 2 is a circuit diagram of a system using the monitoring device.

Referring first to FIG. 1, the monitoring device is indicated generally by the reference numeral 10 and is connected to the lid 9 of a container having therein the liquid which is to be monitored. In a road vehicle, the liquid could be coolant, lubricating oil, fuel or hydraulic fluid by way of example.

The unit 10 comprises an electrically insulated bush 11 which is mounted in the lid 9 by means of a grommet 8 and associated nut 7. Secured to the lower end of the bush 11 is an electrically conductive cup 12 on the base of which is mounted a positive temperature coefficient resistor 13, one terminal of which is connected to the cup 12, and the other terminal of which is connected through a lead to a capacitor 14 and thence to an output lead 15 extending through the bush 11.

Referring now to FIG. 2, the circuit includes positive and negative supply lines 21, 22, and the monitoring device is shown at 10 in FIG. 2 and is of course connected to the line 22, the connection shown representing the connection through the liquid, which will have a relatively low impedance as long as the liquid level is correct, but a substantially increased impedance if the liquid level falls below the cup 12. The capacitor 14 can be in the unit 10 as shown in FIG. 1, or can be part of the circuit, and it will be noted that the capacitor 14 is shown separately from the unit 10 in FIG. 2. The lead 15 is connected through a resistor 23 to the line 21, and is further connected through a resistor 24 to the base of an n-p-n transistor 25 having its emitter connected through a resistor 26 to the line 22 and its collector connected through a resistor 27 to the line 21. The collector of the transistor 25 is further connected to the base of an n-p-n transistor 28, the emitter of which is connected through a resistor 29 to the line 22 and the collector of which is connected through a resistor 31 to the line 21. The collector of the transistor 28 is connected through a capacitor 32 and a resistor 33 in series to the emitter of the transistor 25, and the junction of the capacitor 22 and resistor 33 is connected through a capacitor 35 in series to the lead 15. The emitter of the transistor 28 is connected through a diode 36 and a resistor 37 in series to the lead 15.

The emitter of the transistor 28 is further connected to the base of an n-p-n transistor 39, the emitter of which is connected to the line 22 and the collector of which is connected to the line 21 through the winding 41 of a relay, the winding 41 being bridged by a diode 42 and serving when energised to close a normally open contact 43 which is connected in series with a warning device 44 between the lines 21 and 22.

The transistors 25 and 28 constitute a multi-vibrator oscillator with positive feedback by way of the capacitors 32 and 34 and resistor 35 to the base of the transistor 25, and negative feedback by way of the capacitor 32 and resistor 33 to the emitter of the transistor 25. The amount of the positive feedback is determined by the impedance to earth of the path through the lead 15, capacitor 14 and unit 10, whilst the negative feedback is fixed by the resistors 33 and 26. Assuming that the level of the liquid is above the cup 12, and that the temperature of the liquid is not excessive, then the impedance by way of the unit 10 is low and the positive feedback is insufficient to overcome the negative feedback, so that the circuit does not oscillate. The values of the various resistors in the circuit are selected so that in this condition, both transistors 25 and 28 are on, and current also flows through the diode 36. The conduction of the transistor 25 is insufficient to stop the transistor 28 conducting, and the conduction of the transistor 28 is insufficient to turn on the transistor 39, so that the winding 41 is not energised.

If the level of liquid falls below the cup 12, then the impedance by way of the unit 10 is increased substantially, and there is sufficient positive feedback to the base of the transistor 25 to overcome the negative feedback and cause the circuit to oscillate. During oscillation, when the transistor 28 is on, the transistor 39 is provided with base current and is turned on to energise the winding 41. When the transistor 28 is off, the transistor 39 is also off, but the energy stored in the winding 41 causes current to flow through the diode 42, the period of oscillation being such that the winding 41 is kept energised. The contact 43 therefore closes to energise the warning device 44. By virtue of the diode 36, the off periods of the transistor 25 are substantially in excess of the on periods of the transistor 25, and typically the transistor 39 is turned on for about 90 percent of the period of the multivibrator oscillator. As a result, a substantial proportion of the supply voltage appears as the average voltage across the winding 41.

If the liquid level is above the cup 12, but the temperature of the liquid becomes excessive, then again the impedance through the unit 12 increases substantially and the positive feedback becomes sufficiently large to cause the circuit to oscillate, so that the warning device 44 is energised.

The warning device 44 can take a variety of forms, and could simply be a lamp. However, in some cases an audible warning is to be preferred, and in one arrangement an audible indication can be obtained from the transistor 39 without using the winding 41 by coupling the output from the transistor 39 to the loud-speaker of a car radio, resulting in a high-pitched noise whether or not the radio is on. Alternatively a suitable electro-acoustic transducer may be used in place of the winding 41, and/or a warning lamp may be used in this circuit position. Where the liquid monitored is engine coolant, the relay 41 may be used to control an electrically operated radiator fan, in which case an audible warning device need not be used.

I claim:

1. A liquid level detection system comprising in combination first and second d.c. supply lines, means grounding said second d.c. supply line, an electrically conductive container for said liquid, means grounding said electrically conductive container, a positive temperature coefficient resistor having first and second terminals for connecting said resistor in an electrical circuit, means mounting said positive temperature coefficient resistor in said container with said second terminal of the positive temperature coefficient resistor thermally and electrically coupled to the liquid in said container provided said liquid level is above a predetermined value, a circuit coupling said first terminal of the positive temperature coefficient resistor to said first supply line, said positive temperature coefficient resistor completing a circuit between the first supply line and ground provided the liquid level is above the predetermined value, and warning means sensitive to the impedance to ground through said positive temperature coefficient resistor for giving a warning if said impedance increases substantially.

2. A system as claimed in claim 1 including an oscillator, a negative feedback path for said oscillator, a positive feedback path for said oscillator, said positive feedback path including the positive temperature coefficient resistor and the connection to ground through the liquid and container, said oscillator giving the required warning.

* * * * *